United States Patent
McMurry et al.

(10) Patent No.: US 8,194,838 B2
(45) Date of Patent: *Jun. 5, 2012

(54) SYSTEMS AND METHODS FOR IMPLEMENTING CALL PICKUP IN A SIP ENVIRONMENT

(75) Inventors: Kathleen A McMurry, Richardson, TX (US); John Kenneth Gallant, Plano, TX (US); Mariafranca Gregorat, Dallas, TX (US)

(73) Assignee: Verizon Business Global LLC, Basking Ridge, NJ (US)

( * ) Notice: Subject to any disclaimer, the term of this patent is extended or adjusted under 35 U.S.C. 154(b) by 745 days.

This patent is subject to a terminal disclaimer.

(21) Appl. No.: 12/337,194

(22) Filed: Dec. 17, 2008

(65) Prior Publication Data

US 2009/0097626 A1     Apr. 16, 2009

Related U.S. Application Data

(63) Continuation of application No. 10/635,560, filed on Aug. 7, 2003, now Pat. No. 7,489,771.

(60) Provisional application No. 60/423,269, filed on Nov. 2, 2002.

(51) Int. Cl.
  H04M 3/42     (2006.01)
  H04M 7/00     (2006.01)

(52) U.S. Cl. ......... 379/201.01; 379/211.02; 379/212.01; 379/221.01

(58) Field of Classification Search ............. 379/201.01, 379/211.02, 212.01, 221.01, 32.03; 370/352; 709/227, 206

See application file for complete search history.

(56) References Cited

U.S. PATENT DOCUMENTS

| | | | |
|---|---|---|---|
| 4,574,165 A | 3/1986 | Smith | |
| 4,885,769 A | 12/1989 | Beierle | |
| 5,742,596 A | 4/1998 | Baratz | |
| 5,937,035 A | 8/1999 | Andruska et al. | |
| 6,111,893 A | 8/2000 | Volftsun | |
| 6,577,622 B1 | 6/2003 | Schuster et al. | |
| 6,687,356 B1 | 2/2004 | Glitho et al. | |
| 6,970,909 B2 | 11/2005 | Schulzrinne | |
| 7,110,514 B2 * | 9/2006 | Brown et al. ............ 379/201.01 | |

(Continued)

FOREIGN PATENT DOCUMENTS

EP     0982919     3/2000

(Continued)

OTHER PUBLICATIONS

Mahy et al., "The Session Initiation Protocol (SIP) Replaces Header", IETF Standard-Working_Draft, IETF, vol. SIP, No. 2, Apr. 2002.

(Continued)

*Primary Examiner* — Thjuan K Addy (57) ABSTRACT

A method provides call pickup in a communications network. The method includes initiating a call from a first device to a second device. The call is initiated over one or more networks, where at least one of the one or more networks includes a data network. The method further includes storing information relating to the call initiation between the first device and the second device, receiving a message from a third device during the call initiation, where the message includes a call pickup indication, retrieving the information relating to the call initiation between the first device and the second device, and establishing a call between the first device and the third device based on the retrieved information.

21 Claims, 4 Drawing Sheets

U.S. PATENT DOCUMENTS

| | | | |
|---|---|---|---|
| 2003/0072300 | A1 | 4/2003 | Kwon |
| 2004/0148395 | A1 | 7/2004 | Schulzrinne |

FOREIGN PATENT DOCUMENTS

| | | |
|---|---|---|
| EP | 1014661 | 6/2000 |
| WO | 97/31492 | 8/1997 |
| WO | 98/36550 | 8/1998 |
| WO | 01/08383 | 2/2001 |
| WO | 01/78343 | 10/2001 |
| WO | 01/78418 | 10/2001 |
| WO | 02/19735 | 3/2002 |

OTHER PUBLICATIONS

Mahy et al., "The SIP Replaces Header", IETF Standard-Working_Draft, IETF, vol. SIP, No. 1, Apr. 29, 2002.

Biggs et al., "The SIP Replaces Header", IETF Standard-Working_Draft, IETF, vol. SIP, Jan. 2002.

Biggs et al., "The SIP Replaces Header", IETF Standard-Working_Draft, IETF, No. 1, Jul. 12, 2001.

Sen et al., "Early Media Issues and Scenarios", IETF Standard-Working_Draft, IETF, Jul. 13, 2001.

Rosenberg, "SIP Early Media", IETF Standard-Working_Draft, IETF, Jul. 13, 2001.

Rosenberg et al., "SIP: Session Initiation Protocol", Internet Engineering Task Force, Request for Comment 3261, Jun. 2002, http://www.ietf.org/rfc/rfc3261.txt?number=3261.

Handley et al., "SIP: Session Initiation Protocol", Internet Engineering Task Force, Request for Comment 2543, Mar. 1999, http://www.ietf.org/rfc/rfc2543.txt?number=2543.

U.S. Appl. No. 10/635,560, filed Aug. 7, 2003 entitled "Systems and Methods for Implementing Call Pickup in a SIP Environment", 38 pages.

\* cited by examiner

FIG. 3A

SYSTEMS AND METHODS FOR IMPLEMENTING CALL PICKUP IN A SIP ENVIRONMENT

RELATED APPLICATION

This application is a Continuation of U.S. application Ser. No. 10/635,560, filed Aug. 7, 2003 which claims priority under 35 U.S.C. §119(e) based on U.S. Provisional Application Ser. No. 60/423,269, filed Nov. 2, 2002, the entire disclosures of which are incorporated herein by reference.

FIELD OF THE INVENTION

The present invention relates generally to communications networks and, more particularly, to systems and methods for implementing call pickup in a session initiated protocol (SIP) environment.

BACKGROUND OF THE INVENTION

Many telephone communications systems, such as private branch exchanges, offer a feature known as "call pickup" where a first telephone may be used to answer a call that is ringing a second telephone. This generally requires that the telephones be associated with a common "pickup group" designated within the telephone system. This feature is useful in places, such as in a business office, where a receptionist might answer lines for other people when it is noticed that the lines are ringing without being answered, or where an inbound call may be answered by any one of a number of people who are in the vicinity of the ringing telephone but who have their own telephones by which to answer the call. In some arrangements, one person may be said to "cover" another person's telephone.

In some systems providing multiple line telephones, it is possible for a telephone to detect the ringing of a specific line that may normally correspond to a given person. If this call goes unanswered by the person, other people using other telephones may observe the ringing line and elect to pickup the call by selecting the ringing line and going "off-hook" to answer the call.

It is also possible to implement call pickup features in a system where relatively simple telephones are used and the telephones lack the special buttons and displays to provide visibility and access to multiple lines. By virtue of provisioning at a private branch exchange (PBX) or a switch, telephones may be assigned to common pickup groups. Thus, when one telephone belonging to the pickup group rings, another telephone belonging to the pickup group may be used to answer the call by an answering party by going off-hook and dialing a specific special sequence, such as "*55" which the switch or PBX recognizes as signifying a desire to pickup a call from another telephone in the group. Upon recognizing the call pickup sequence, the switch examines the group to identify the call causing the other telephone to ring, and connects the call instead to the answering party.

While call pickup, in general, is now well known in traditional telephony, the proliferation of data transport networks, most notably the Internet, is causing a revolution in telephony and other forms of real-time communications. Businesses that have been accustomed to having telephony traffic and data traffic separately supported over different systems and networks are now moving towards so-called "converged networks," where telephone voice traffic and other forms of real-time media are converted into digital form and carried by a packet data network along with other forms of data. Now that the technologies are feasible to support it, voice over data transport offers many advantages in terms of reduced capital and operating costs, resource efficiency, and flexibility.

Thus, the field of telephony is turning away from the traditional use of circuit switches operating under stored program control or under the control of industry standardized intelligent network (IN) call processing. Instead, new service processing architectures (such as the so-called "softswitch" approach) and protocols (like SIP) have arisen, significantly patterned upon techniques developed for the Internet and other data networks.

Aside from cost considerations, a significant advantage and motivation for this change in service processing is the promise of enhanced new services and faster deployment of services. New packet-switched telephony networks, coupled with the aforementioned new service processing paradigms, are being designed to offer users unprecedented levels of flexibility and customization options.

Even at the periphery of the network, new generation of end user terminal devices are now replacing the traditional telephones and even the more recent PBX phone sets. These new end user terminal devices, such as those offered by Cisco Systems, Inc. and Pingtel Corporation, may connect directly to a common data network, via, for example, an Ethernet connection, and feature large visual displays to enhance the richness of the user interface.

Another significant sign of radical departure from traditional telephony relates to the manner in which destinations are expressed. Rather than using the familiar telephone number to place a call to a particular telephone station, the new paradigm relies upon identifying a party whom one is trying to reach, independent of any particular location or station address, such as a telephone number. The current trend is that this identification is alphanumeric and resembles an e-mail address or URI (universal resource identifier) as is now commonly used in other types of communication. The new telephones described above can "dial" such alphanumeric addresses.

This technique of specifying a party rather than a station ties into another novel aspect of packet-switched telephony, namely that user location is allowed to be very dynamic. By default, a given user may be associated with a particular communications terminal (telephone, cellular telephone, pager, etc.) in the traditional sense. In addition, the user may approach one of the newer types of IP telephone appliances and register his presence to receive calls at the given telephone appliance. Any inbound calls will then go to the most recently registered address. Given this mobility, the identification scheme for destination parties must be decoupled from the addressing of specific terminals. Soon, the familiar practice of memorizing a "telephone number" may become obsolete, or at least supplemented, by alternative symbolic expressions for specifying a given destination party, also known as a "terminating" party in the parlance of traditional telephony.

In the context of telephony communications systems that use SIP-compliant service processing or similar techniques to coordinate call set-up, a need arises to provide for call pickup capabilities.

SUMMARY OF THE INVENTION

Systems and methods consistent with the principles of the invention address this and other needs by providing call pickup functionality in a data communications network.

In an implementation consistent with the principles of the invention, a method for providing call pickup in a communications system that includes a group of communication stations operably coupled to the communications system is provided. The method includes originating a call from a first communication station to a second communication station via a network server; alerting the second communication station of the call; storing context information pertaining to the call at a database; receiving, at the network server, at least one call pickup indication from a third communication station; responsive to the call pickup indication, obtaining, at the network server, the context information from the database; and applying the context information to establish communication between the first communication station and the third communication station.

In another implementation consistent with the principles of the invention, a method, performed by a network server, for providing call pickup in a communications system is provided. The method includes transmitting a first message from the network server to a called party device, where the first message initiates a call establishment between a calling party device and the called party device; receiving a second message at the network server from a third party device during the call establishment, where the second message includes a call pickup indication; canceling, via the network server, the call establishment between the calling party device and the called party device in response to the second message; establishing a dummy session between the network server and the third party device; transmitting a third message from the network server to the third party device, where the third message initiates a call establishment between the calling party device and the third party device; receiving, at the network server, a fourth message from the third party device, where the fourth message causes the network server to cancel the dummy session; and establishing a call between the calling party device and the third party device in response to the fourth message.

In yet another implementation consistent with the principles of the invention, a method for providing call pickup in a communications network is provided. The method includes initiating a call from a first device to a second device, where the call is initiated over one or more networks and where at least one of the one or more networks includes a data network. The method further includes storing information relating to the call initiation between the first device and the second device, receiving a message from a third device during the call initiation, where the message includes a call pickup indication, retrieving the information relating to the call initiation between the first device and the second device, and establishing a call between the first device and the third device based on the retrieved information.

In still another implementation consistent with the principles of the invention, a method for providing call pickup in a communications system is provided. The method may include initiating a call from a first device to a second device, where the call is initiated over one or more networks and at least one of the one or more networks includes a data network. The first device is unable to initiate a call pickup. The method may further include receiving a message from a third device during the call initiation, where the message includes a call pickup indication, canceling the call initiation between the first device and the second device, and establishing a call between the first device and the third device.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of implementations consistent with the principles of the invention refers to the accompanying drawings. The same reference numbers in different drawings may identify the same or similar elements. Also, the following detailed description does not limit the invention. Instead, the scope of the invention is defined by the appended claims and their equivalents.

Implementations consistent with the principles of the invention provide call pickup functionality in a data communications network.

Exemplary System

Figure 1:
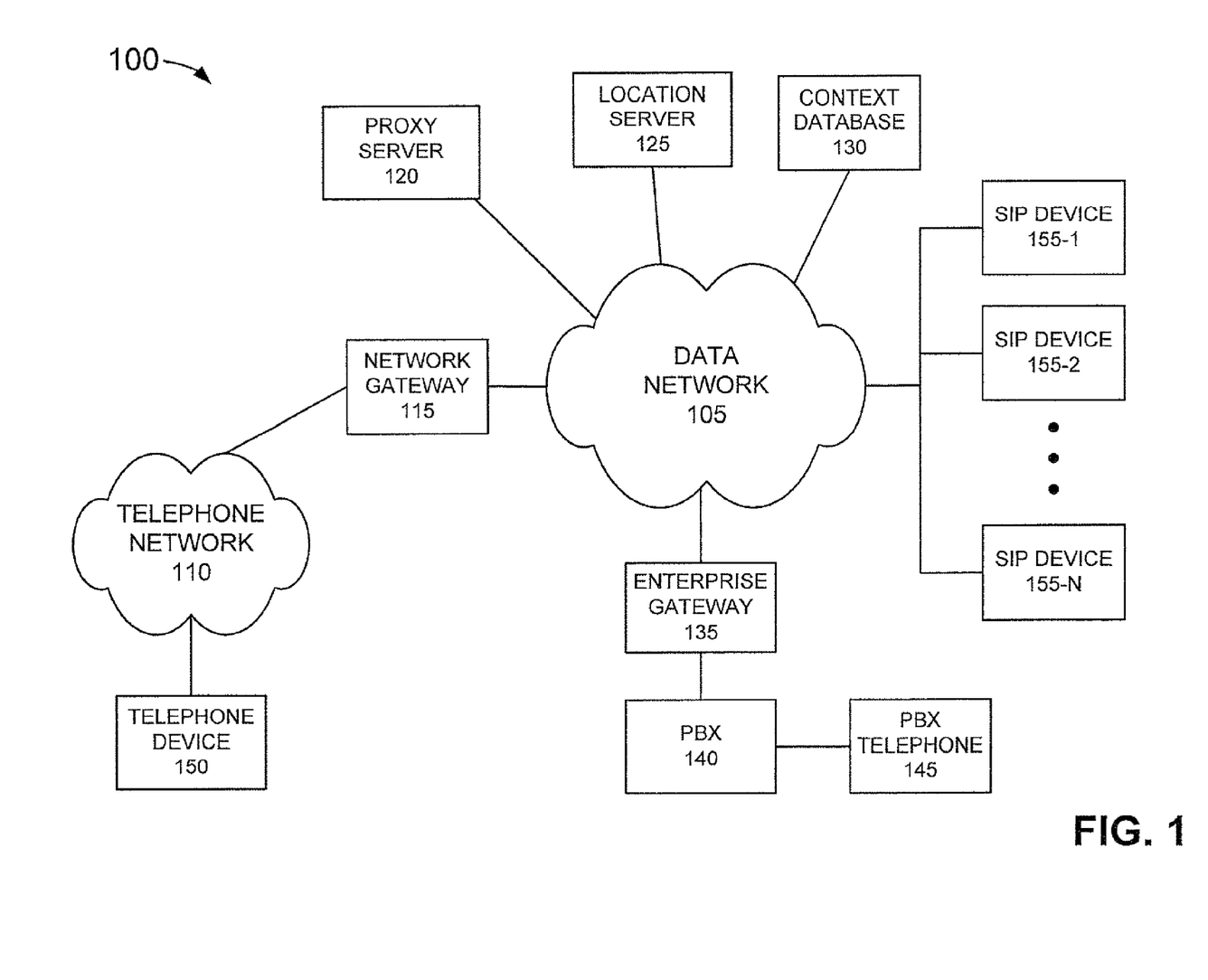
FIG. 1 illustrates an exemplary system in which systems and methods, consistent with the principles of the invention, may be implemented.

FIG. 1 illustrates an exemplary system 100 in which systems and methods, consistent with the principles of the invention, may be implemented. As illustrated, system 100 may include a data network 105, a telephone network 110, a network gateway 115, a proxy server 120, a location server 125, a context database 130, an enterprise gateway 135, a PBX 140, and a group of telephone-type devices 145-155. The number of devices illustrated in FIG. 1 is provided for simplicity. In practice, a typical system could include more or fewer devices than illustrated in FIG. 1.

Data network 105 may include one or more networks, such as the Internet, an intranet, a local area network (LAN), a wide area network (WAN), or another type of network that is capable of transmitting data from a source device to a destination device. Telephone network 110 may include one or more public switched telephone networks (PSTNs) or other types of switched networks. Telephone network 110 may also include one or more wireless networks.

Network gateway 115 may include a device that allows divergent transport networks to cooperatively carry traffic. A network gateway, such as network gateway 115, often provides for interoperation at two levels—between different signaling schemes and between different media forms. For example, network gateway 115 may adapt between SS7 signaling of telephone network 110 and SIP or H.323 protocols used by data network 105. At the same time, network gateway 115 may adapt analog or pulse code modulation (PCM) encoded voice signals in a telephone bearer channel to a packetized data stream suitable for transport over data network 105.

Proxy server 120, also commonly referred to as a network server, may include a device that facilitates the establishment of SIP calls. As described in Internet Engineering Task Force (IETF) document RFC 2543, proxy server 120 may act as both a server and a client for the purpose of making requests on behalf of other clients. Requests are serviced internally or by passing them on, possibly after translation, to other servers. Proxy server 120 may interpret, and, if necessary, rewrite a request message before forwarding it.

Location server 125 may include a device that serves as a repository for end user information to enable, for example, address validation, feature status, and real-time subscriber feature configuration. Additionally, location server 125 may store system configuration information and user location information that enables location server 125 to determine the latest known location information pertaining to a particular user.

Context database 130 may include a device that stores call context records. These call context records may be accessible to one or more instances of proxy servers 120 and location servers 125 in system 100. Context database 130 allows for persistence and sharing of state information or other data related to service processing among proxy servers 120 and location servers 125.

Enterprise gateway 135 may include a device that adapts between PBX signals and data signals for transport over a data network, such as LAN, or a service provider's network. As a signaling interface to PBX 140, enterprise gateway 135 may use Integrated Digital Services Network (ISDN), Circuit Associated Signaling (CAS), or other PBX interfaces (e.g., European Telecommunications Standards Institute (ETSI) PRI, R2). As shown, enterprise gateway 135 may provide connectivity from a PBX 140. Signaling for calls from PBX 140 to data network 105 may include information which uniquely identifies the customer, trunk group, or carrier. This allows private numbers to be interpreted in their correct context.

PBX 140 may include trunks or lines for a single business customer or location (e.g., PBX telephone device 145) or multiple business customers or locations. Telephone-type devices 145-155 may include PBX telephone device 145, telephone device 150, and SIP devices 155-1 through 155-N (referred to collectively hereinafter as "SIP devices 155"). PBX telephone device 145 may include any conventional type of PBX telephone. Telephone device 150 may include any type of common device capable of transmitting voice signals over and receiving voice signals from a telephone network, such as telephone network 110. Telephone device 150 may include, for example, a Plain Old Telephone Service (POTS) telephone, a computer device that transmits voice signals over and receives voice signals from telephone network 110 via a modem, a cellular telephone, a pager, etc.

SIP devices 155 may include any client (e.g., a computer device, a web-appliance, etc.) that is configured to provide SIP telephone functions. SIP devices 155 may, for example, take the form of standalone devices—e.g., a SIP telephone may be designed and configured to function and appear like a POTS telephone. SIP devices 155 may also include a software client that may run, for example, on a conventional personal computer (PC) or laptop computer.

Although implementations consistent with the principles of the invention are described below in the context of the Session Initiation Protocol (SIP) and an Internet Protocol (IP)-based network, one of ordinary skill in the art will recognize that the present invention may be generally applicable to other equivalent or analogous communication protocols (e.g., International Telecommunication Union (ITU) H.323) and/or types of transport networks (e.g., asynchronous transfer mode (ATM), frame relay, etc.). Both the ITU H.323 standard and the IETF's SIP are examples of protocols that may be used for establishing a communications session among terminals, such as telephone-like devices 145-155, connected to a network. The SIP protocol is described in IETF document RFC 2543 and its successors (RFC 3261 et al.). Various architectures have been proposed in conjunction with these protocols with a common theme of having an address resolution function (e.g., location server 125) somewhere in the network to control features on behalf of users and to maintain current information on how to reach any destination party.

It should be understood throughout this disclosure that, although SIP-type messages are shown for convenience, any type of protocol or a mixture of such protocols may be applied in various parts of the overall system. In particular, the routing requests and responses between proxy server 120 and location server 125 may strictly or loosely conform to SIP or some other standardized protocol, or may be proprietary in nature.

Figure 2:
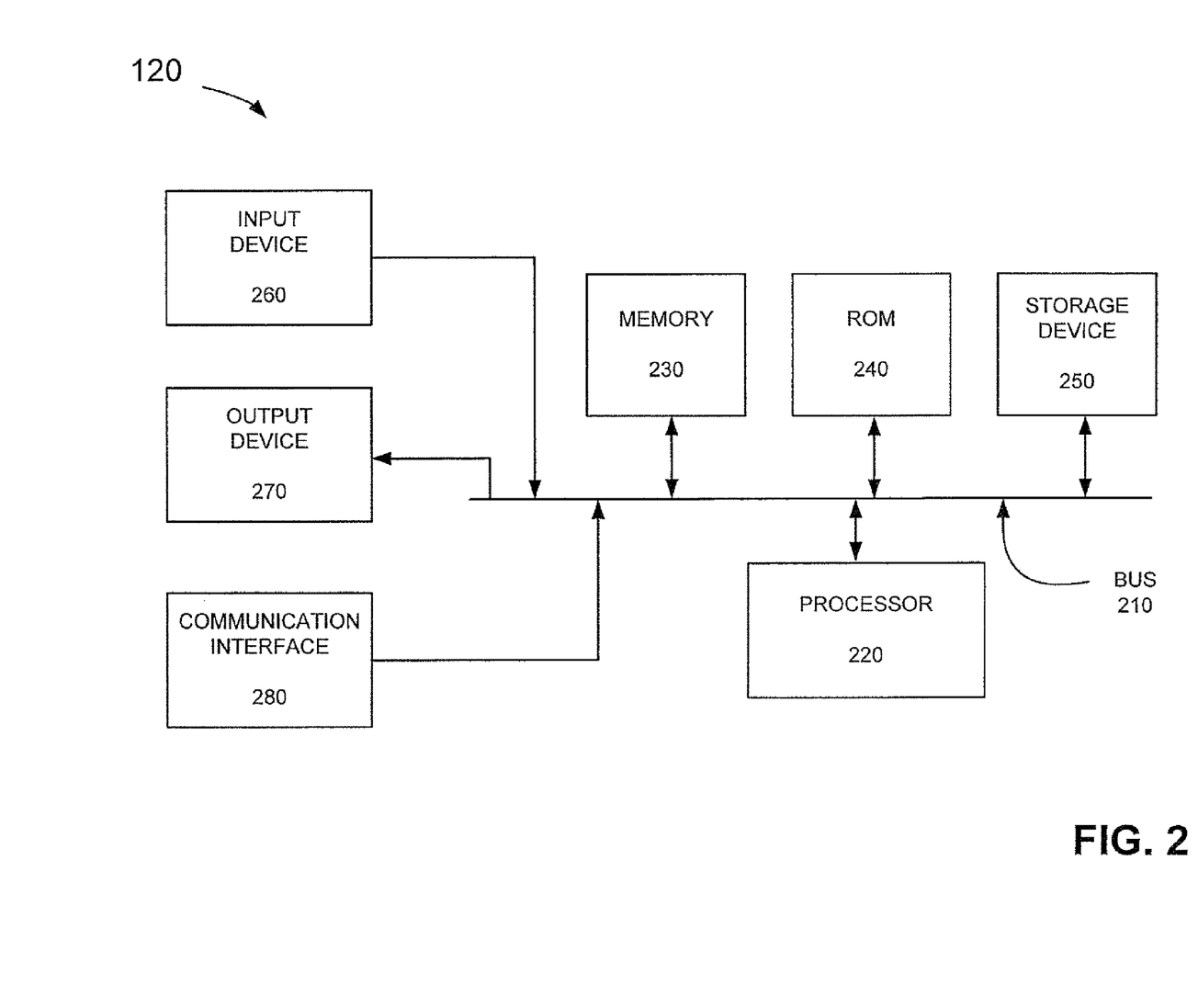
FIG. 2 illustrates an exemplary configuration of the proxy server of FIG. 1 in an implementation consistent with the principles of the invention.

FIG. 2 illustrates an exemplary configuration of proxy server 120 in an implementation consistent with the principles of the invention. It will be appreciated that location server 125, context database 130, and one or more of telephone-type devices 145-155 may be similarly configured. As illustrated, proxy server 120 may include a bus 210, a processor 220, a memory 230, a read only memory (ROM) 240, a storage device 250, an input device 260, an output device 270, and a communication interface 280. Bus 210 may include one or more conventional buses that permit communication among the components of proxy server 120.

Processor 220 may include any type of conventional processor or microprocessor that interprets and executes instructions. Memory 230 may include a random access memory (RAM) or another type of dynamic storage device that stores information and instructions for execution by processor 220. Memory 230 may also be used to store temporary variables or other intermediate information during execution of instructions by processor 220.

ROM 240 may include a conventional ROM device and/or another type of static storage device that stores static information and instructions for processor 220. Storage device 250 may include a magnetic disk or optical disk and its corresponding drive and/or some other type of magnetic or optical recording medium and its corresponding drive for storing information and/or instructions.

Input device 260 may include any conventional mechanism or combination of mechanisms that permits the operator to input information to proxy server 120, such as a keyboard, a mouse, a microphone, a pen, a biometric input device, such as a voice recognition device, etc. Output device 270 may include any conventional mechanism or combination of mechanisms that outputs information to the operator, including a display, a printer, a speaker, etc.

Communication interface 280 may include any transceiver-like mechanism that enables proxy server 120 to communicate with other devices and/or systems, such as location server 125. For example, communication interface 280 may include a modem or an Ethernet interface. Alternatively, communication interface 280 may include other mechanisms for communicating via a data network, such as network 105.

Proxy server 120 may implement the functions described below in response to processor 220 executing software instructions contained in a computer-readable medium, such as memory 230. A computer-readable medium may be defined as one or more memory devices and/or carrier waves. In alternative embodiments, hardwired circuitry may be used in place of or in combination with software instructions to implement features consistent with the principles of the invention. Thus, implementations consistent with the principles of the invention are not limited to any specific combination of hardware circuitry and software.

Exemplary Processing

In providing a call pick-up feature in a SIP-based environment, it desirable to avoid relying on specialized implementations within SIP telephones. SIP telephones, which may have to interoperate with one another in a communications system, may be manufactured by different companies and may adhere to different interpretations of how SIP-based features should work. This means that peer-to-peer interactions among SIP telephones can be problematic. Accordingly, implementations consistent with the principles of the invention address the issue of providing call pickup features without relying on peer-to-peer interoperability.

Figure 3A:
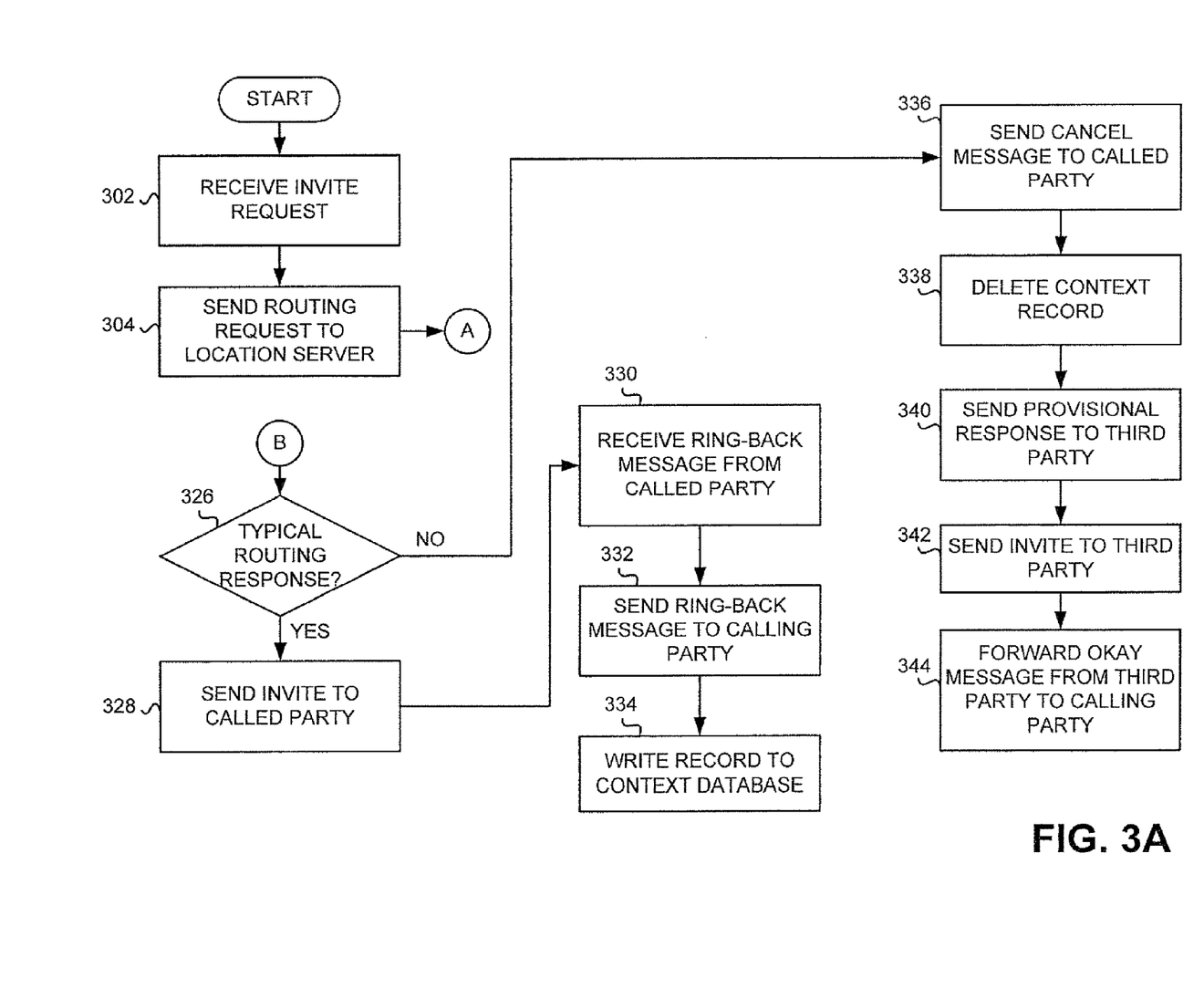
FIGS. 3A and 3B illustrate an exemplary process for providing call pick-up in a SIP environment in an implementation consistent with the principles of the invention.
Figure 3B:
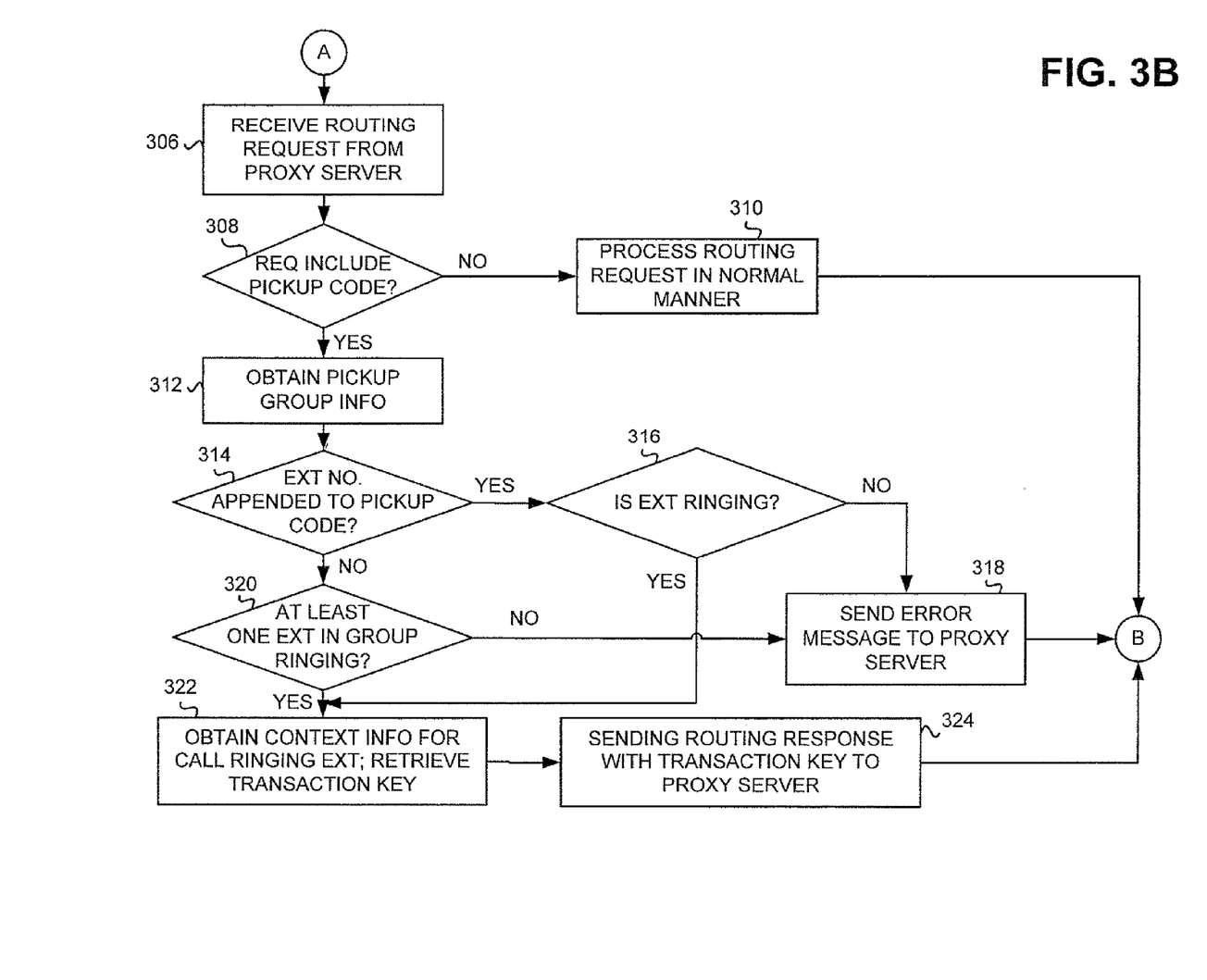

FIGS. 3A and 3B illustrate an exemplary process for providing call pickup in a SIP environment in an implementation consistent with the principles of the invention. Processing may begin with a calling party using a telephone-type device, such as telephone device 150 initiating a call to a desired called party using, for example, SIP device 155-1. In the scenario of FIGS. 3A and 3B, the called party will not answer the call from the calling party. Instead, another party (referred to hereinafter as a "third party") will perform a call pickup and establish connection with the calling party in response to the call to the called party.

To initiate the call, proxy server 120 may receive an INVITE request from calling party's telephone device 150 (act 302, FIG. 3A). The INVITE request indicates that the called party is being invited to participate in a session. The INVITE request may provide the called party with enough information to join the session. The INVITE request may also indicate the type of media calling party's telephone device 150 is able to receive and possibly the media calling party's telephone device 150 is willing to send.

In response to the INVITE message, proxy server 120 may send a routing request to location server 125 to determine how to best contact the destination that the calling party wishes to reach, namely the called party (act 304). Proxy server 120 may transmit an acknowledgement of the INVITE message back to calling party's telephone device 150.

Location server 125 may receive the routing request from proxy server 120 (act 306, FIG. 3B) and determine whether the routing request includes a pickup code (act 308). The pickup code may be, for example, "*55" or some other predetermined key sequence. At this point, location server 125 may determine that the routing request does not include a pickup code. Location server 125 may then process the routing request in a normal manner (act 310). Called party may be reachable at any one of several addresses. These addresses or contacts may correspond to conventional telephones, SIP telephones, cellular telephones, pagers, etc. The list of addresses may change as the called party moves about and registers as being present at telephone-type devices 145-155.

Location server 125 may analyze the INVITE request and respond to proxy server 120 in one of several possible ways. Location server 125 may disallow the session if the calling party is not permitted to contact the called party, if the called party's address cannot be recognized, or if the called party has a feature activated that renders the called party unreachable by the calling party.

Assume that location server 125 determines that the calling party is allowed to contact the called party and identifies SIP device 155-1 as the location of the called party. Location server 125 may send a routing response message to proxy server 120 that identifies SIP device 155-1.

Upon receiving the routing response message, proxy server 120 may determine whether the routing response message is a typical routing response message (act 326, FIG. 3A). A typical routing response message is one that provides redirection to proxy server 120. An atypical routing response message, according to an implementation consistent with the principles of the invention, is one that indicates a transaction identifier, such as a branch tag, to proxy server 120, rather than provide redirection to proxy server 120.

Since the routing response message received from location server 125 is in response to an INVITE request from a calling party, proxy server 120 may determine that the routing response message is a typical routing response message (act 326). In this case, proxy server 120 may send an INVITE message to called party at SIP device 155-1, which essentially causes SIP device 155-1 to start ringing, as a telephone rings, or otherwise alert someone to answer the call (act 328). As is customary, SIP device 155-1 may begin ringing and send back a ring-back response to proxy server 120 to signify that SIP device 155-1 is ringing.

Proxy server 120 may receive the ring-back response from SIP device 155-1 and pass this call progress information along to calling party's telephone device 150 (acts 330 and 332). Proxy server 120 may also pass context information to a context database 130 (act 334). As described above, context database 130 may store call context records that may be accessible to one or more instances of proxy servers and location servers in the communications system. In the present scenario, context database 130 may be used by proxy server 120 to store a record of the important details of proxy server 120's recent INVITE message to called party's SIP device 155-1. This record may include, and may later be identified by, a unique transaction identifier, such as a so-called "branch tag," as described in the IETF's SIP documentation. A branch tag is essentially a signature that a SIP server or other SIP handling device may append to a SIP message to identify a transaction. At least for scalability and fail-over design, such devices are implemented as "statelessly" as possible. The branch tag is often used in a SIP message to refer to earlier related SIP messages that a SIP device may have handled during a given session or transaction.

At this point, calling party, using telephone device 150, has placed a call to called party and SIP device 155-1 is ringing. Assume, a third party recognizes the ringing of SIP device 155-1 and decides to answer the call at, for example, SIP device 155-M (where 1<M≦N) using a call pickup feature. To invoke this action, third party may send an INVITE request to proxy server 120 using SIP device 155-M (act 302, FIG. 3A). To send the INVITE request, the third party may pick up a receiver on SIP device 155-M or otherwise go "off-hook" and then dial "*55," or some other predetermined sequence, to initiate call pickup. Alternatively, the third party may have preprogrammed a button on SIP device 155-M that may be pressed to send the appropriate INVITE request that causes call pickup. In either case, the Request-URI portion of the INVITE request will bear the dialed sequence, namely the "*55" code.

In one implementation consistent with the principles of the invention, the call pickup indication sent by the third party may also include an extension number appended after the "*55" pickup code. Doing so may enable the third party to specify a particular extension number from which a call is to be picked up. This may be useful when several telephone-type devices belonging to the same pickup group are ringing at the same time and the third party desires to answer a specific one of these. Other alternatives are contemplated for special codes that signify to the network that, for example, the telephone-type device in the group that has been ringing the longest is to be picked up by the third party.

Proxy server 120 may treat the INVITE request from the third party as any other INVITE request, meaning that proxy server 120 may transmit a corresponding routing request to location server 125 (act 304). Location server 125 recognizes that the Request-URI of "*55" is significant with respect to invocation of call pickup. Location server 125 may receive the routing request (act 306, FIG. 3B) and determine whether the routing request includes the pickup code (act 308). Upon recognizing this code, location server 125 may access the context record previously written by proxy server 120 in act 334 (FIG. 3A).

Location server 125, being the typical repository for, or at least having access to, profile information for users in system 100, may retrieve profile information pertaining to the third party, especially to identify any pickup group(s) to which the third party may be assigned (act 312, FIG. 3B). This identification may be made based on information contained in the INVITE request that was transmitted by the third party.

Location server 125 may determine whether an extension number is associated with the pickup code in the routing request (act 314). As set forth above, the calling party may append an extension number to the pickup code to allow the third party to specify a particular extension number from which a call is to be picked up. This option may be used during those instances where more tan one telephone-type device is ringing simultaneously. If the particular extension number specified in the INVITE request from the third party is not currently ringing (act 316), location server 125 may send an error message to proxy server 120 (act 318). If, on the other hand, the particular extension number specified in the INVITE request from the third party is currently ringing (act 316), processing may proceed with act 322 described below.

If in act 314, location server 125 determines that no extension number has been appended to the pickup code, location server 125 may identify other members in the same pickup group as the third party and then retrieve from context database 130 records representing any of these members for which a call is currently in a "ringing" status or to which an outstanding INVITE requests has been proxied and as yet answered (act 320). If none of the other members of the pickup group is currently in a ringing status, location server 125 may send an error message to proxy server 120 (act 318).

If, on the other hand, location server 125 determines that the extension number appended to the pickup code is ringing (act 316) or, when no extension number is appended to the pickup code, that a member of the pickup group is ringing (act 320), location server 125 may obtain context information for the appropriate telephone-type device (i.e., SIP device 155-1) (act 322). Location server 125 may also retrieve a transaction key, such as branch tag, that was previously generated by proxy server 120 and stored with the context information (act 322). Location server 125 may then forward the context information and transaction key in the form of a routing response message to proxy server 120 (act 324).

Upon receiving the routing response message, proxy server 120 may determine whether the routing response message is a typical routing response message (act 326, FIG. 3A). Since the routing response message includes a transaction key "belonging to" proxy server 120, proxy server 120 may determine that the routing response message is atypical. Proxy server 120 may send a CANCEL message to the called party's SIP device 155-1 that acts to cancel the earlier INVITE message that caused SIP device 155-1 to ring (act 336). Proxy server 120 may then delete the context record from context database 130 that was stored in act 334 because the context record is no longer needed and the INVITE message that it represented has now been canceled (act 338).

Proxy server 120 may, in one implementation consistent with the principles of the invention, send a provisional response to the third party's SIP device 155-M (act 340). The provisional response may be of the type that is normally used to provide for "early media" (e.g., audible communications to the caller before a connection with the called party is actually established). This mock early media session may act as a "place holder" and, in fact, there may be no media communications between proxy server 120 and SIP device 155-M. Using this mechanism to satisfy the INVITE request from third party's SIP device 155-M allows for advantageous use of the SIP "Replaces" header, as described below.

Proxy server 120 may send an INVITE request to third party's SIP device 155-M that appears to come from calling party's telephone device 150 and indicates a new connection that should be made to replace the existing mock early media session described above (act 342). In accordance with normal handling of such Replaces header, third party's SIP device 155-M may send a CANCEL request to proxy server 120 and then send a SIP OKAY message, or the like, to proxy server 120. Proxy server 120 may receive the CANCEL request and the OKAY message from third party's SIP device 155-M and forward the OKAY message to calling party's telephone device 150 (act 344).

In typical fashion, calling party's telephone device 150 may send an acknowledgment message to proxy server 120, which passes the acknowledgment message on to third party's SIP device 155-M. Thereafter, the calling party and third party may establish a session.

Invocation of the call pickup feature may be detected based on the reception of the call pickup code at proxy server 120. The use of the call pickup feature may then be billed, for example, on a per-use basis. For example, upon establishing a session between the calling party and the third party, the third party may be appropriately billed for invoking the call pickup feature. Alternatively, the third party may pay a flat monthly fee for unlimited use of the call pickup feature.

It should be noted that that the techniques described herein allow SIP telephones, as well as non-SIP telephones, such as those behind an enterprise gateway, to exercise call pickup functionality. That is, while the above description focused on establishing a call between a telephone device 150 connected to a telephone network and a SIP device 155-1 through 155-N, it will be appreciated that the techniques described herein are equally applicable to establishing calls between any telephone-type device and any other telephone-type device.

Moreover, it will be appreciated from the above description that the user's device that initiated the call pickup processing (referred to above as the third pat's SIP device 155-M) is the only device for which extensions above and beyond the base SIP specification are needed. Put another way, regardless of the device with which the calling party is associated or its capability to support call pickup, call pickup processing consistent with the principles of the invention may be used as long as the party invoking the call pickup feature (i.e., the third party) is associated with a device that supports the above-described extensions to the SIP specification.

CONCLUSION

Systems and methods, consistent with the principles of the invention, allow for call pickup processing to be implemented in a data network.

The foregoing description of exemplary embodiments of the present invention provides illustration and description, but is not intended to be exhaustive or to limit the invention to the precise form disclosed. Modifications and variations are possible in light of the above teachings or may be acquired from practice of the invention. For example, while series of acts have been described with respect to FIGS. 3A and 3B, the order of the acts may be varied in other implementations consistent with the present invention. Moreover, non-dependent acts may be implemented in parallel.

No element, act, or instruction used in the description of the present application should be construed as critical or essential to the invention unless explicitly described as such. Also, as used herein, the article "a" is intended to include one or more items. Where only one item is intended, the term "one" or similar language is used.

The scope of the invention is defined by the claims and their equivalents.

What is claimed is:

1. A method for providing call pickup in a communications system including a plurality of communication stations operably coupled thereto, the method comprising:
   originating a call from a first communication station to a second communication station via a network server;
   alerting the second communication station of the call;
   storing context information pertaining to the call at a database;
   receiving, at the network server, at least one call pickup indication from a third communication station;
   responsive to the call pickup indication, obtaining, at the network server, the context information from the database;
   establishing an early media session between the third communication station and the network server; and
   applying the context information to establish communication between the first communication station and the third communication station.

2. The method of claim 1, further comprising:
   determining, at the network server, whether the third communication station is eligible to receive the call, and
   where the applying comprises:
   applying the context information to establish communication between the first communication station and the third communication station, when it is determined that the third communication station is eligible to receive the call.

3. The method of claim 2, where the determining whether the third communication station is eligible to receive a call from the first communication station occurs prior to obtaining the context information.

4. The method of claim 2, where the determining comprises:
   determining whether the third communication station is in a same group as the second communication station,
   determining whether an extension number in the group is involved in a call establishment when the third communication station is in the same group as the second communication station, and
   determining that the third communication station is eligible to receive a call from the first communication station when an extension number in the group is determined to be involved in a call establishment.

5. The method of claim 1, where the early media session does not include media communication between the third communication station and the network server.

6. The method of claim 1, where the establishing comprises:
   sending, by the network server, a provisional response message to the third communication station, based on the at least one call pickup indication.

7. The method of claim 6, further comprising:
   issuing a session initiated protocol (SIP) message comprising a replaces header from the network server to the third communication station, to cause the third communication station to establish communication with the first communication station.

8. The method of claim 1, where the at least one call pickup indication includes an extension number, and
   where the method further comprises:
   determining, prior to obtaining the context information, whether the extension number is in a ringing status, and
   where the obtaining the context information occurs when the extension number is determined to be in a ringing status.

9. A method, performed by a network server, for providing call pickup in a communications system, the method comprising:
   transmitting a first message from the network server to a called party device, the first message initiating a call establishment between a calling party device and the called party device;
   receiving a second message at the network server from a third party device during the call establishment, the second message including a call pickup indication;
   canceling, via the network server, the call establishment between the calling party device and the called party device in response to the second message;
   establishing an early media session between the network server and the third party device;
   transmitting a third message from the network server to the third party device, the third message initiating a call establishment between the calling party device and the third party device;
   receiving, at the network server, a fourth message from the third party device, the fourth message causing the network server to cancel the early media session; and
   establishing a call between the calling party device and the third party device in response to the fourth message.

10. The method of claim 9, where the establishing comprises:
    sending, by the network server, a session initiated protocol (SIP) provisional response to the third party device in response to the second message.

11. The method of claim 9, further comprising:
    issuing, by the network server, a routing request message, in response to the second message.

12. The method of claim 9, further comprising:
    issuing a session initiated protocol (SIP) message comprising a replaces header from the network server to the third party device, the SIP message causing the third party device to send the fourth message to the network server.

13. The method of claim 9, further comprising:
    storing, following transmitting the first message, context information relating to the call between the calling party device and the called party device; and
    retrieving the context information in response to receiving the second message,
    where the establishing a call between the calling party device and the third party device includes:
    using the retrieved context information for establishing the call between the calling party device and the third party device.

14. The method of claim 9, further comprising:
    determining, prior to the canceling, whether the third party device is eligible to receive the call from the calling party device.

15. The method of claim 14, where the determining comprises:

determining whether the third party device is in a same group as the called party device, determining whether an extension number in the group is involved in a call establishment when the third party device is in the same group as the called party device, and determining that the third party device is eligible to receive a call from the calling party device when an extension number in the group is determined to be involved in a call establishment.

16. The method of claim 9, where the call pickup indication includes an extension number, and where the method further comprises:

determining, prior to canceling the call establishment between the calling party device and the called party device, whether the extension number is in a ringing status, and where the canceling the call establishment between the calling party device and the called party device occurs when the extension number is determined to be in a ringing status.

17. A server comprising:

means for transmitting a first message to a first device, the first message initiating a call establishment between a second device and the first device;

means for receiving a second message from a third device during the call establishment, the second message including a call pickup indication;

means for canceling the call establishment between the second device and the first device in response to the second message;

means for establishing an early media session with the third device;

means for transmitting a third message to the third device, the third message initiating a call establishment between the second device and the third device;

means for receiving a fourth message from the third device, the fourth message causing the server to cancel the early media session; and means for establishing a call between the second device and the third device in response to the fourth message.

18. The server of claim 17, where the means for establishing the early media session comprises:

means for sending a provisional response message to the third device, in response to the call pickup indication.

19. The server of claim 17, further comprising:

means for issuing a routing request message, in response to the call pickup indication; and means for receiving a routing response.

20. The server of claim 17, further comprising:

means for issuing a session initiated protocol (SIP) message comprising a replaces header to the third device, the SIP message causing the third device to send the fourth message to the server.

21. The server of claim 17, further comprising:

means for storing context information relating to the call between the second device and the first device; and means for retrieving the context information in response to receiving the second message, where the means for establishing the call between the second device and the third device comprises:

means for using the retrieved context information for establishing the call between the second device and the third device.

\* \* \* \* \*